June 12, 1928.　　　　　　　　　　　　　　　1,673,014
R. F. MORRISON
APPARATUS FOR ASSEMBLING ARTICLES
Filed Dec. 13, 1924　　　　9 Sheets-Sheet 6

Patented June 12, 1928.

1,673,014

UNITED STATES PATENT OFFICE.

ROBERT FRANCIS MORRISON, OF OAK PARK, ILLINOIS, ASSIGNOR TO WESTERN ELECTRIC COMPANY, INCORPORATED, OF NEW YORK, N. Y., A CORPORATION OF NEW YORK.

APPARATUS FOR ASSEMBLING ARTICLES.

Application filed December 13, 1924. Serial No. 755,636.

This invention relates to an apparatus for assembling articles, and more particularly to an apparatus for packaging articles.

The principal object of the invention is to provide an improved apparatus for assembling articles.

In accordance with the general features of the invention there is provided a continuously driven belt which presents articles, such as blocks of carbon used in electrical protective devices associated with telephone systems, one by one to a predetermined position wherein a horizontal plunger pushes them one by one laterally from the belt onto a vertical or elevating plunger. When a predetermined number of blocks, such as five, have been placed thereon, the elevating plunger moves upwardly into a magazine in which the blocks are retained in a layer and the plunger returns to its original position. Suitable mechanism is provided for withdrawing paper from a roll and placing it against each layer of the blocks as they are stacked and thereafter shearing the inserted paper from the roll. Adjoining the magazine is a chute in which a carton is positioned to receive the assembled blocks. After twenty layers of five blocks each have accumulated in the magazine another horizontal plunger not only pushes them out of the magazine and into the carton, but also pushes the carton and its contents clear of the chute. Should the supply of blocks on the belt for any reason be stopped, contacts are opened in an electrical circuit controlling a solenoid, to disengage a clutch, thereby stopping the packing mechanism. Upon the replenishing of the supply of blocks the solenoid causes the re-engagement of the clutch.

Other objects and advantages of the invention will more fully appear from the following detailed description taken in connection with the accompanying drawings which illustrate one embodiment thereof, and in which

Fig. 7 is an enlarged fragmentary plan view partly in section showing the magazine in which the blocks are stacked and the associated horizontal plunger;

It is believed that the improved apparatus for assembling and packaging articles will be fully understood from the following detailed description of an apparatus by which it may be performed.

Figure 1:
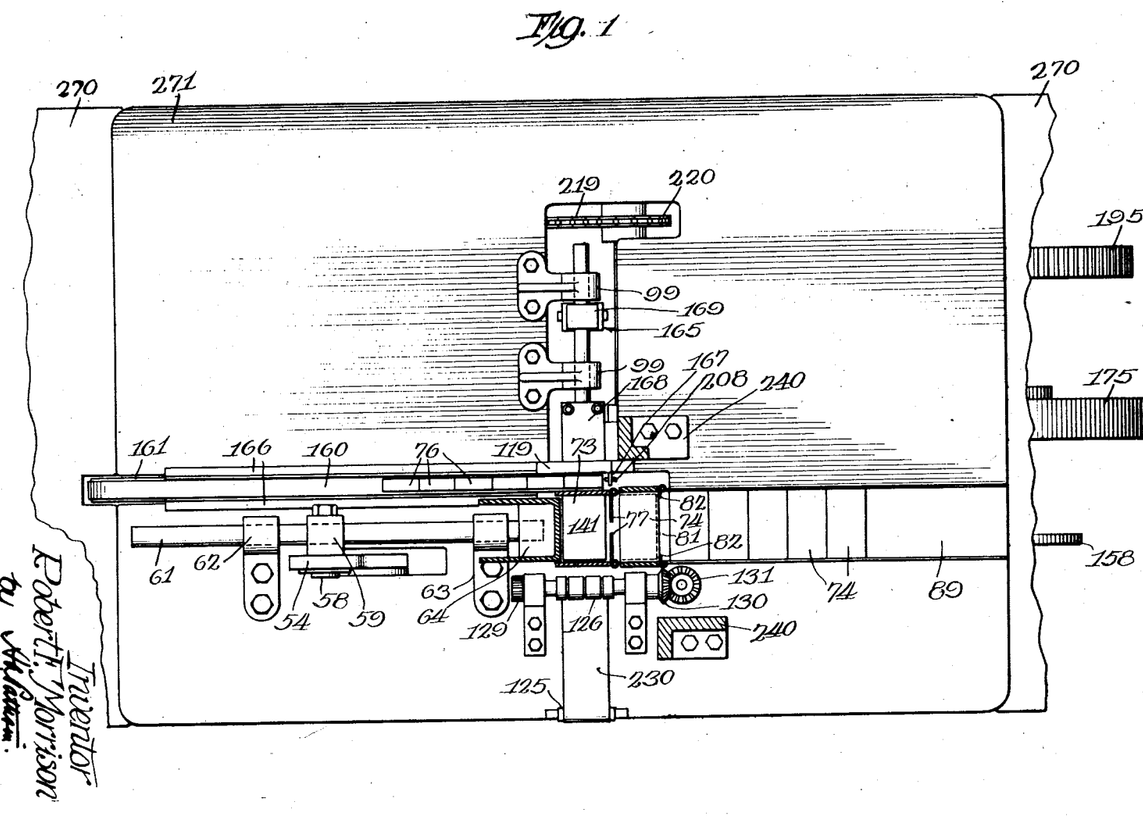
Fig. 1 is a plan view of a packing machine partly in section embodying the features of the invention.
Figure 2:
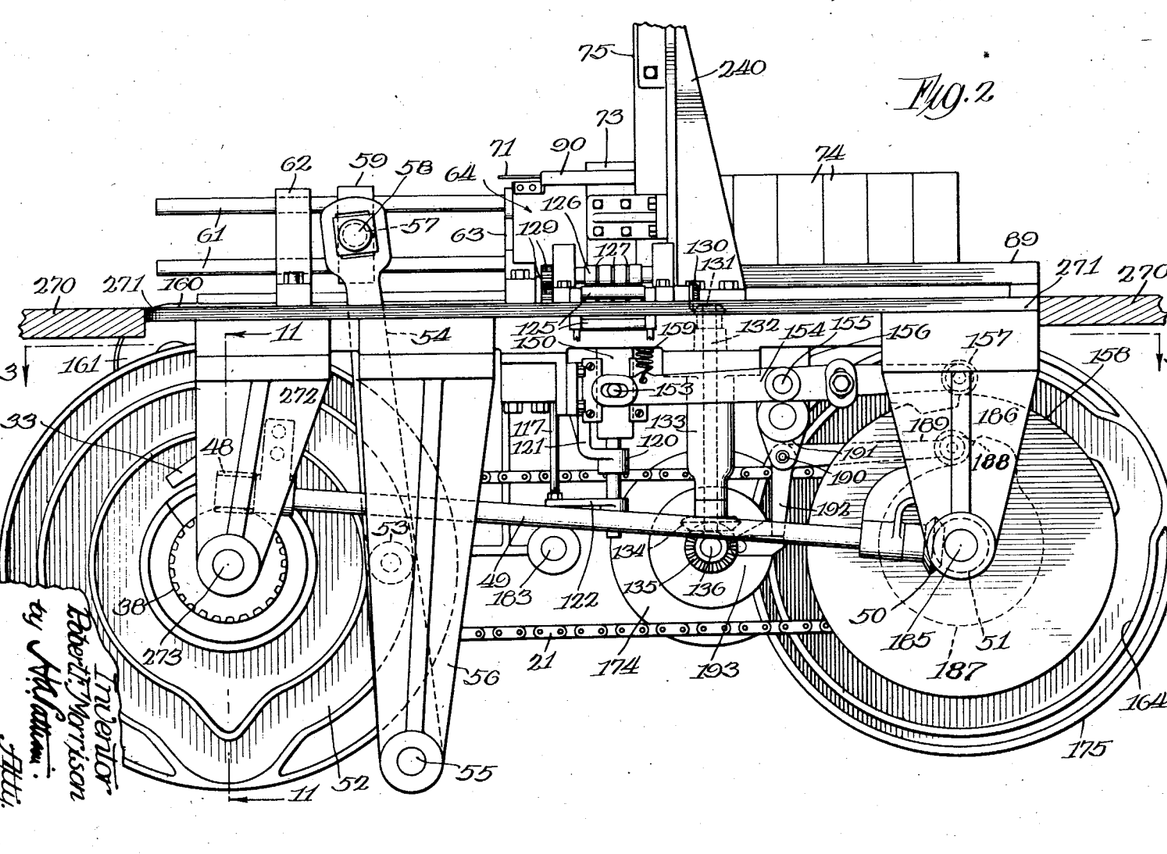
Fig. 2 is a fragmentary front elevation of the packing mechanism shown in Fig. 1, some of the parts being omitted in order to more clearly illustrate the relation of certain parts.
Figure 11:
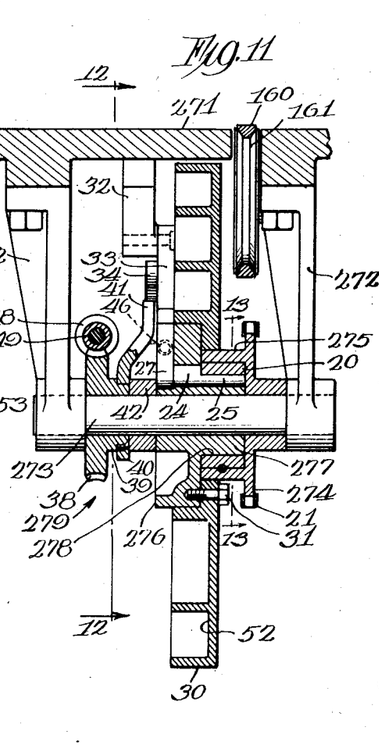
Fig. 11 is a fragmentary sectional view taken on the line 11—11 of Fig. 2, illustrating the clutch for controlling the operation of the horizontal plunger for pushing the blocks into a carton.
Figures 12, 13:
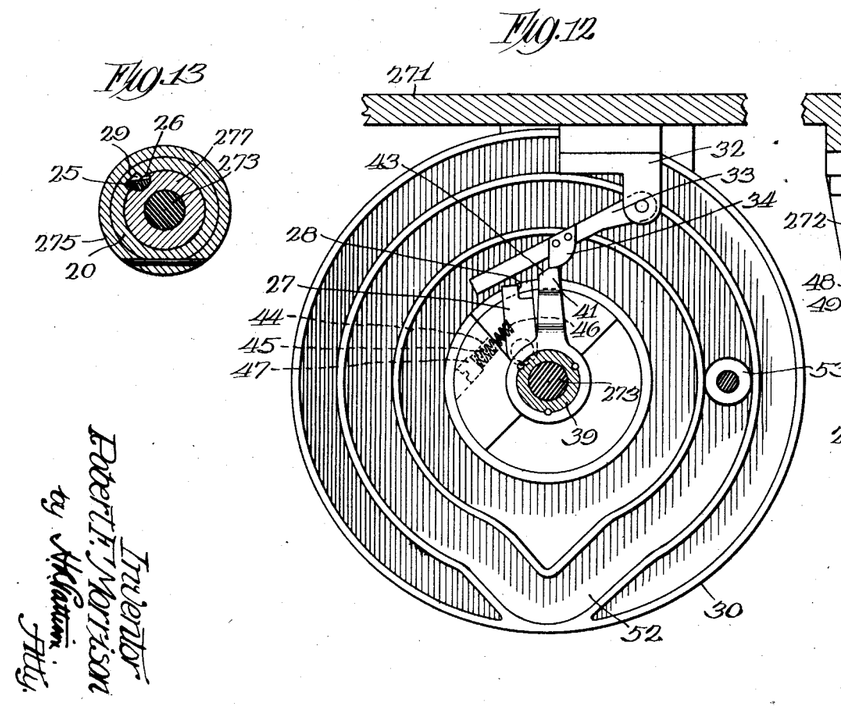
Fig. 12 is a sectional view taken on the line 12—12 of Fig. 11.
Fig. 13 is a sectional view taken on the line 13—13 of Fig. 11.

Referring now to the drawings in detail in which like reference numerals designate similar parts throughout the several views, 270 denotes a bench of any usual construction on which is suitably secured a frame 271 of a machine embodying the features of the invention (Figs. 1 and 2). A pair of brackets 272 attached to the underside of the frame carry a stationary shaft 273. A sprocket 274 (Fig. 11) rotatably mounted on the shaft 273 is adapted to be driven by a chain 21 (Fig. 4) and has an elongated hub 275 (Fig. 11). Also rotatably mounted on the shaft 273 is a circular member 276 which has an elongated hub 277 which projects into a circular recess 278 in the hub 275. The hubs 275 and 277 are the principal members of a clutch hereinafter referred to generally by the reference numeral 279. A sleeve 20 surrounds the hub 277 in the recess 278, and is splined to the hub 275. Movably mounted in the circular member 276 is a circular rod 24, one end of which is machined into a semi-circular portion 25, which portion fits in a semi-circular recess 26 in the hub 277 (Figs. 11 and 13). Formed on the opposite end of the circular rod 24 is a detent like member 27, the end of which is machined to form a shoulder 28 (Figs. 11 and 12). The sleeve 20, as best shown in Fig. 13, is provided with a rectangular recess 29, which is adapted to be engaged by the semi-circular portion 25 of the rod 24, as will be more fully described hereinafter in the operation of the mechanism. Surrounding a portion of the hub 275 and the circular member 276 is a cam member 30, which is secured to the circular member 276 by a screw 31.

A bracket 32 is secured to the underside of the frame, intermediate the pair of brackets 272. Pivotally mounted in the bracket 32 is an arm 33, which has secured thereto intermediate its end a detent 34. A worm wheel 38 is rotatably mounted upon the shaft 273, and has an elongated hub 39 to which is secured a circular element 40 on which is formed a bent arm 41. A collar 42 surrounds the shaft 273 and separates the worm wheel 38 from the circular member 276 (Fig. 11). The detent 34 is adapted to engage a formed edge 43 of the bent arm 41, as best shown in Figs. 11 and 12. The circular member 276 is provided with an aperture 44 (Fig. 12) in which is located a compression spring 45, one end of which projects into a recess 46 in the detent like member 27, and the other end abuts against a screw 47 threaded into the aperture 44. The worm wheel 38 is driven in a direction opposite to the clutch arms 27 by a worm 48, secured to one end of a rod 49 on the other end of which rod is keyed a bevel gear 50 which is driven by a bevel gear 51 (Fig. 2).

Figures 8, 9, 10:
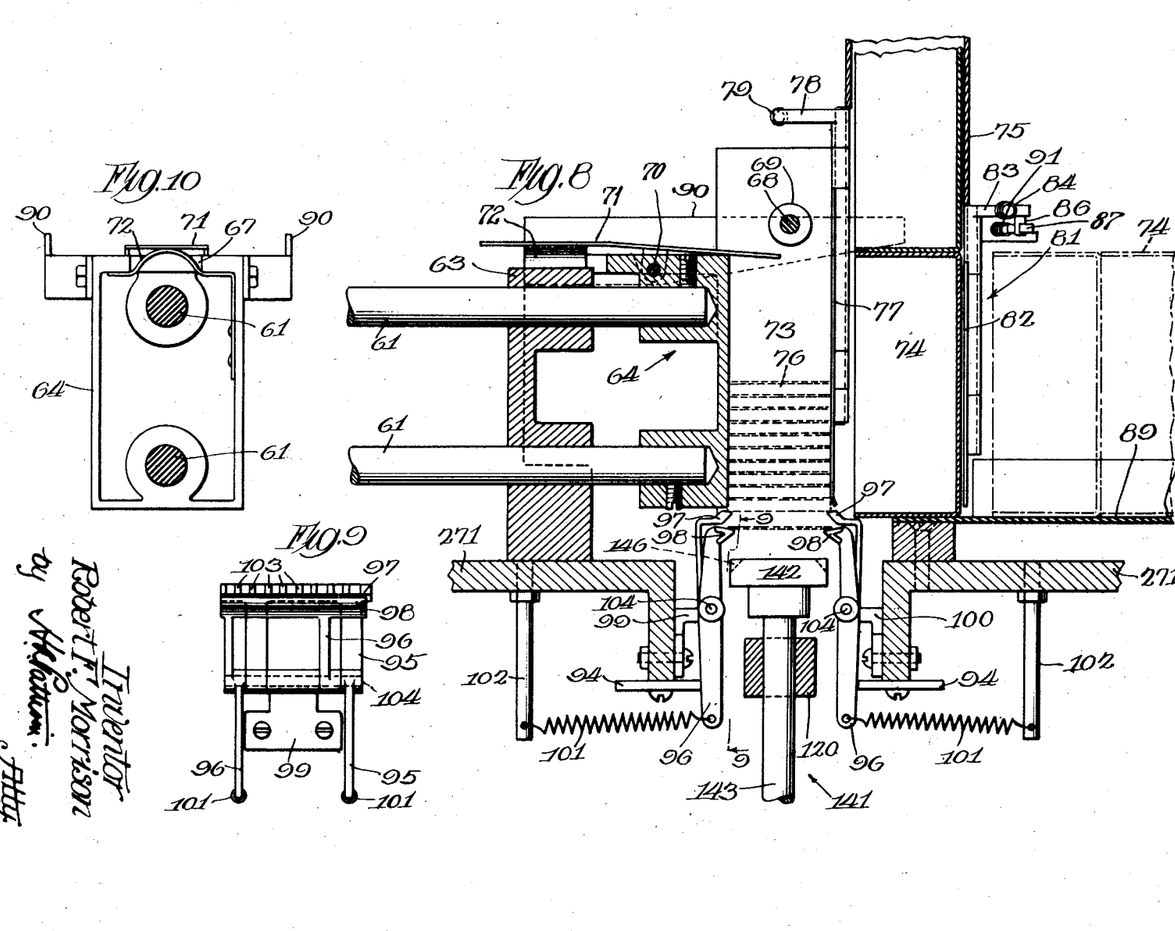
Fig. 8 is a fragmentary vertical sectional view taken on the line 8—8 of Fig. 7.
Fig. 9 is a detail view taken on the line 9—9 of Fig. 8 showing the retaining fingers.
Fig. 10 is a fragmentary end view, partly in section, of a portion of Fig. 8.

The cam member 30 is provided with a cam groove 52, which is computed to meet the requirements of the packing machine, and in which rides a disk 53, secured to the side of a rod 54 (Fig. 2). The rod 54 is pivotally mounted at one end at a point 55 on a bracket 56, suitably suspended from the underside of the frame. The other end of the rod 54 is enlarged and has an aperture 57 in which is located a bolt 58 pivotally secured to a connecting member 59. Extending through the member 59 and adapted to reciprocate therewith is a pair of plunger rods 61, suitably journaled in bearings 62 and 63. The plunger rods 61 carry a plunger hereinafter referred to generally by the reference character 64 (Figs. 2 and 8).

Figures 17, 18, 19:
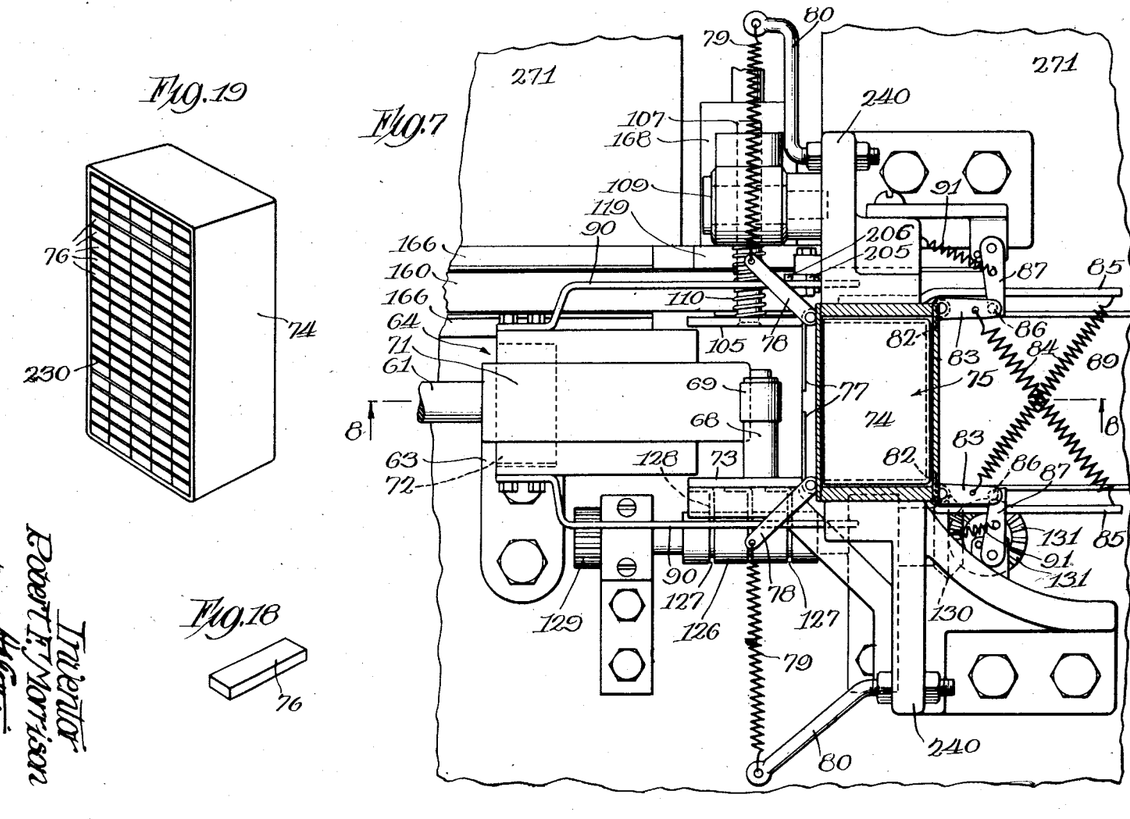
Fig. 18 is a perspective view of a carbon protector block.
Fig. 19 is a perspective view of a carton filled with 100 protector blocks, each layer therein being separated from other layers by sheets of paper.

Pivoted at a point 70 on top of the plunger 64 is a flat lever like member 71 (Figs. 6 and 8), one end of which member rests on a spring 72, secured to an upper portion of the plunger. It will be noted that a portion of the plunger is cut away forming an opening 67 through which the spring 72 protrudes, and that the spring 72 is attached to the inner wall of the plunger 64 (Fig. 10). The plunger 64 is rectangular, is preferably hollow, and is adapted to be moved through a magazine 73 into a carton 74 (Fig. 19), which is positioned in the lower part of a carton chute 75. The frame forms the bottom of the chute 75 and supports the lowermost carton 74 in the chute 75 in a position adjacent the magazine 73, in which articles, such as carbon protector blocks (Fig. 18), are stacked (Figs. 7 and 8). Suitably positioned and secured in the upper part of the magazine 73 is a shaft 68 which carries a rotatable roll 69 which is adapted to engage the top of the member 71 when the plunger 64 is actuated forwardly to transfer the stacked blocks 76 in the magazine 73 into the positioned carton 74, as will be more fully explained hereinafter.

The carton 74 (Fig. 19) as disclosed herein is designed to contain twenty layers of blocks, each layer having five blocks. It is to be understood, however, that the machine may be modified to pack other types of articles and different quantities thereof without departing from the spirit and scope of the invention, and that the invention is to be limited only in so far as defined by the scope of the appended claims.

Furthermore, the mechanism for actuating the plunger 64 is so timed that when twenty layers of five blocks each have accumulated in the magazine 73 the plunger is moved forwardly, transferring the stacked blocks from the magazine 73 into the carton 74, which action will be fully described in the operation of the mechanism.

Figures 5, 6:
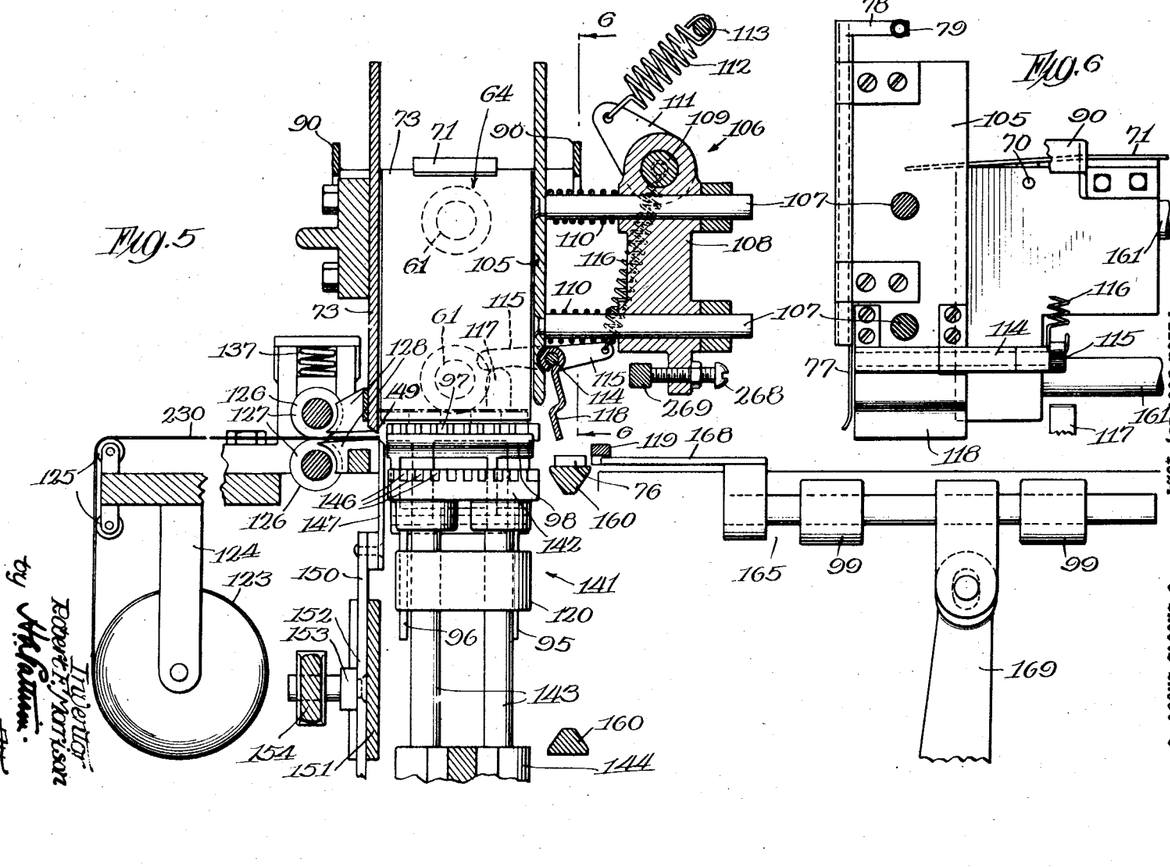
Fig. 5 is an enlarged fragmentary vertical sectional view taken on the line 5—5 of Fig. 4.
Fig. 6 is a fragmentary vertical sectional view taken on the line 6—6 of Fig. 5.

The portion of the rear of the magazine 73 opening into the bottom carton 74 in the chute 75 is provided with a pair of hinged doors 77 which carry arms 78 on their hinge portions (Fig. 7). Each of the arms 78 has secured to its free end a spring 79 which connects the arm 78 with another arm 80, suitably carried by the frame. The pair of springs 79 normally maintain the doors 77 of the magazine 73 closed, but are adapted to permit the doors 77 to be opened into the carton 74 when the plunger 64 is actuated. The chute 75 is provided with an opening 81 (Figs. 6 and 7) which provides an egress for the filled carton 74 and its contents. The carton 74 is maintained in the chute 75 by two hinged stops 82, which it will be noted are smaller than the hinged doors 77 (Fig. 6). Each of the stops 82 carries an arm 83 on its hinge portion, which arm pivots to open the stops when the carton 74 and its contents are transferred from the chute 75 onto a table portion 89 on the frame. Secured to each of the arms 83 intermediate its ends is a spring 84 which connects the arm 83 with another arm 85 carried by the frame and at all times urges the stops inwardly. Attached to an end of each of the arms 83 is a locking pin 86 which normally engages the end of a lever 87, suitably pivoted to the frame. Attached at one end to each of the arms 87 is a spring 91, the other end of which is suitably secured to the frame, which returns the lever 87 to its normal position after an operation thereof. Each of the levers 87 is adapted to be engaged by a bent arm 90, secured to the side of the plunger 64 (Figs. 7 and 8.)

Located immediately below the magazine 73 (Figs. 8 and 9) are two pairs of levers 95 and 96 which terminate in retaining fingers 97 and 98, respectively. One lever 95 and one lever 96 are pivoted intermediate their ends to a member 99 attached to the frame, and the other lever 95 and the other lever 96 are pivoted to a similar member 100 likewise attached to the frame. Secured to each of the levers 95 and 96 at the end opposite the end on which the finger is formed, is a spring 101 which connects the lever to a pin 102 suitably secured to the frame. Positioned directly above each of the springs 101 (Fig. 7) and suitably mounted in the frame is a stop pin 94 against which the levers normally abut, limiting the effect of the springs 101. Each of the fingers 97 is provided with a plurality of teeth 103, as best shown in Fig. 9, the purpose of which will be described hereinafter. It will be noted that the pair of fingers 97 are located immediately over the other pair of fingers 98, each pair of fingers 97 and 98 being movable about a common point 104 (Fig. 8).

One side, 105, of the magazine 73 is resiliently mounted on a device hereinafter referred to generally by the reference character 106 (Figs. 5 and 7). This device consists essentially of a pair of pins 107 to which the side 105 of the magazine 73 is secured at right angles. The pair of pins 107 are journaled in a housing 108 pivotally mounted on a shaft 109, suitably supported from the frame. Located intermediate the side 105 and the housing 108 and surrounding each of the pins 107 is a compression spring 110 which presses the side 105 of the magazine 73 inwardly.

Figure 4:
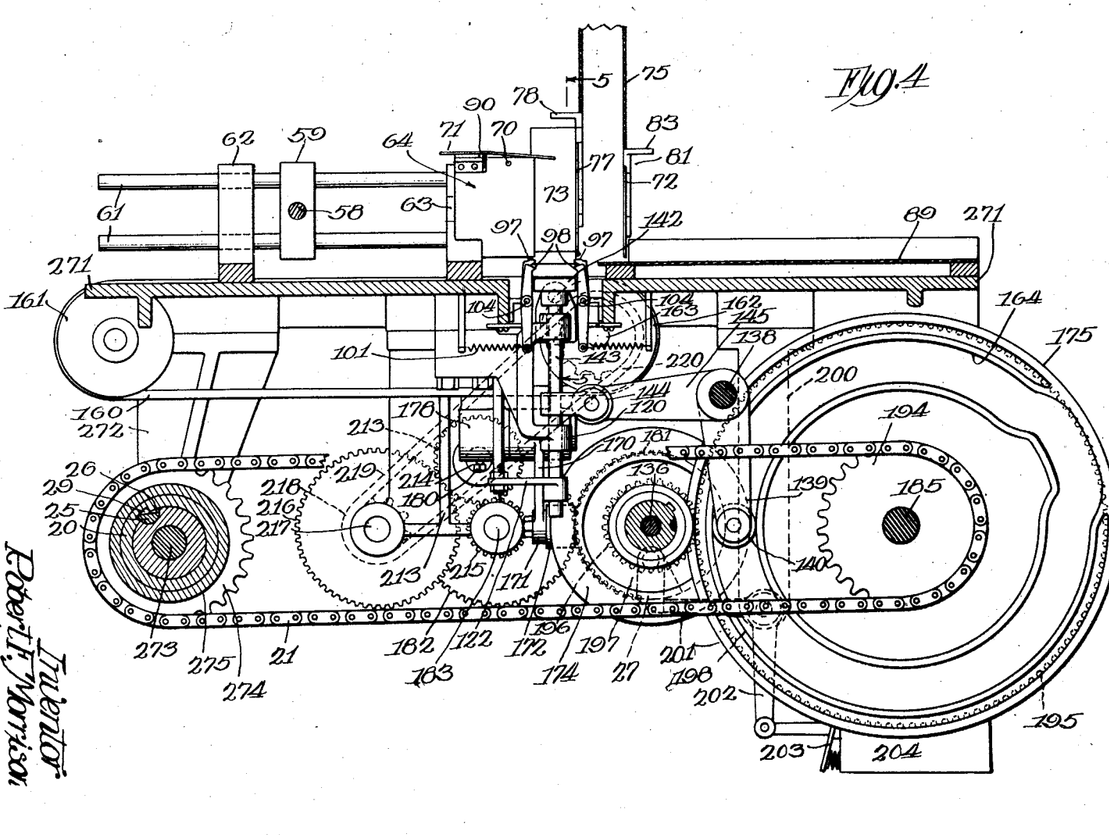
Fig. 4 is a fragmentary vertical sectional view taken on the line 4—4 of Fig. 3.

Surrounding the shaft 109 and integral with the housing 108 is an arm 111, to the free end of which is secured a spring 112 which connects it to a pin 113 suitably supported from the frame. Threaded into the lower part of the housing 108 is an adjusting screw 268, the end of which abuts against a stop 269 carried by the frame. Pivoted upon a pin 114 which is suitably supported by the side 105 is a lever 115, one end of which is connected by a spring 116 to the shaft 109, the other end being adapted to make contact with the upper end of a rod 117, the function of which will be more fully described hereinafter. Surrounding the pin 114 and integral with the lever 115 is a bent element 118 which is adapted to move with the lever 115 (Fig. 4).

Figure 3:
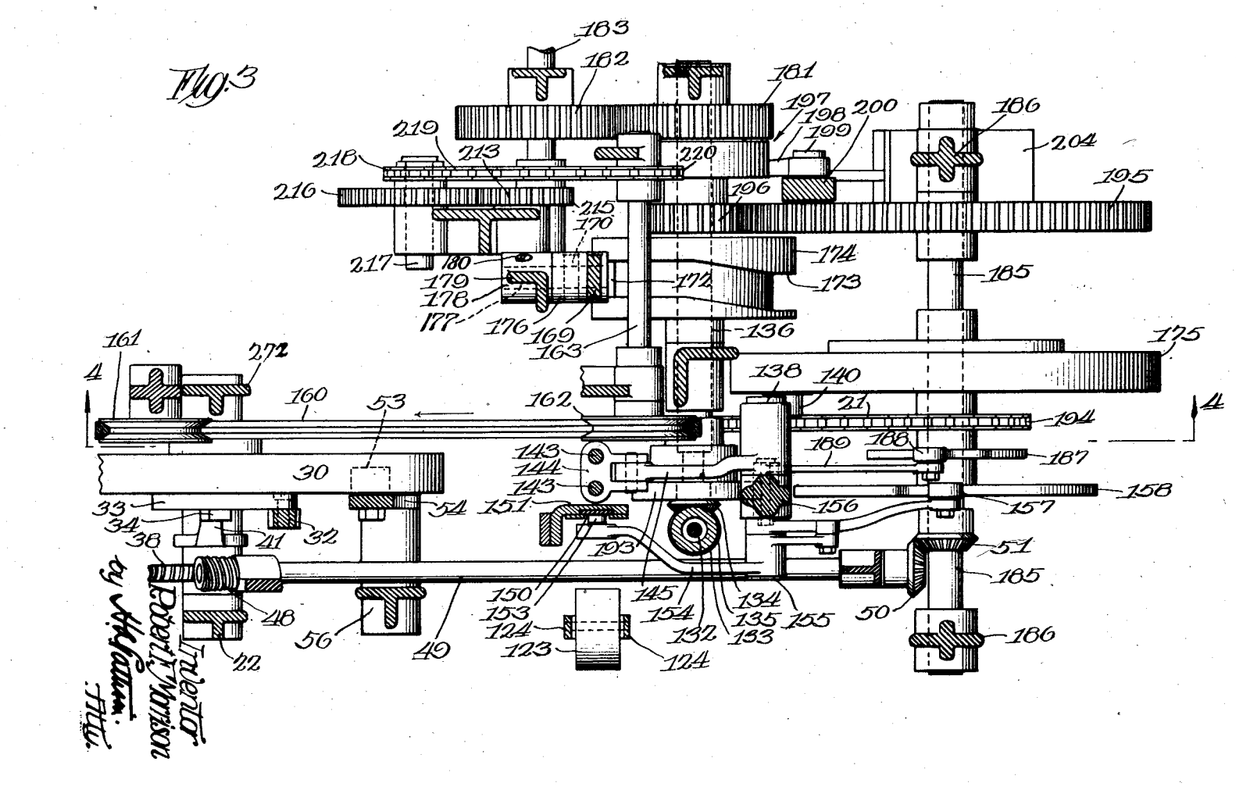
Fig. 3 is a fragmentary plan sectional view taken on the line 3—3 of Fig. 2.

Positioned to one side of and below the magazine 73 is a removable roll 123 of preferably thin paper 230, which roll is rotatably mounted in a pair of brackets 124 underslung from the frame. The paper 230 is fed from the roll 123 over a pair of rotatably mounted rollers 125 between a pair of grooved feed rolls 126 and onto the lower pair of retaining fingers 98. Each groove 127 of the rolls 126 has a corresponding finger 128 (Figs. 5 and 7), the free end of which projects into the groove and prevents the paper from adhering to the rolls. The fingers 128 may be mounted in any suitable manner to the frame. Each of the rolls 126 carries on its end a gear 129 (Fig. 2), the pair of gears 129 being at all times in mesh. The lower roll 126 is driven by a pair of bevel gears 130 and 131 (Fig. 2), the bevel gear 131 being secured to a shaft 132, which is journaled in a bearing 133 secured to the under part of the frame and is driven by a pair of bevel gears 134 and 135 through a shaft 136 (Figs. 2 and 3).

The lower roll 126 is preferably made of steel and the upper roll 126 is preferably made of rubber. The upper roll is adapted through the medium of a pair of compression springs 137 (Fig. 5) to at all times exert a downward pressure on the paper thereby minimizing slippage.

Positioned immediately below the magazine 73 and in alignment with the orifice thereof is an elevating plunger hereinafter referred to generally by the reference character 141 (Figs. 5 and 8.) The plunger 141 consists essentially of a supporting member 142 and a pair of rods 143 integral therewith, which are pivotally attached to one end 144 of a bell crank lever 145 (Figs. 3 and 4) pivoted on a pin 138 supported by a projection 156 of the frame (Fig. 3). The other end 139 is provided with a roller 140 which is adapted to ride in a cam groove 164 of a cam member 175. The supporting member 142 is provided with a plurality of grooves 146 which are adapted to mesh with the teeth 103 of the retaining fingers 97 (Figs. 5 and 8), when the plunger 141 is raised, as will be more fully described hereinafter. The rods 143 are journaled in bearings 120 (Fig. 4) suitably supported from the frame by an arm 121. The lower end of the rod 117 which passes through an aperture in the frame and whose upper end is adapted to be brought into contact with the lever 115 is connected to the lower ends of the rods 143 by a link 122 (Fig. 4), which causes the rod 117 to reciprocate with the plunger 141.

A blade 147 (Fig. 5) is located to one side of the plunger 141 and is adapted to cooperate with a shearing edge 148 formed on a side 149 of the magazine 73 to shear the paper which has been placed on the pair of fingers 98. The blade 147 is secured to a member 150 (Figs. 2 and 5), reciprocably mounted in a bearing 151. The bearing 151 is provided with a slot 152 in which rides a pin 153 secured to the member 150. The pin 153 is pivotally secured to one end of a lever 154 pivoted intermediate its ends on the pin 155 supported by the projection 156 of the frame (Fig. 2). The other end of the lever 154 carries a roller 157 which is adapted to ride on the periphery of a cam 158. The end of the lever 154 which is secured to the pin 153 is normally urged upwardly by a tension spring 159 connected thereto at one end and mounted in the frame at the other end (Fig. 2).

Extending lengthwise of the packing machine is a continuously driven belt 160 which passes to one side of the elevating plunger 141. The belt 160 (Fig. 4), is carried by two rotatably mounted pulleys 161 and 162 (Fig. 3). Pulley 162 is secured to and driven by a shaft 163. Located on the side of the belt opposite to that on which the plunger 141 is located is a plunger hereinafter referred to generally by the reference character 165 (Fig. 5), supported by bearings 99 carried by the frame. The blocks 76 are fed forward between a pair of guides 166 (Fig. 1) by the belt 160 and are intercepted by a stop 167 suitably attached to the frame which positions them in alignment with the top of the elevating plunger 141. The plunger 165 carries a flat member 168 (Fig. 5) which is adapted, upon the forward movement of the plunger, to push one block laterally off the belt 160 onto the member 142 of the elevating plunger 141. A guide 119 is secured to the frame as best shown in Figs. 1 and 5, which maintains the member 168 in alignment with the magazine 73 and the top of the plunger 141. The plunger 165 is reciprocated by one arm 169 of a lever 170 secured at one end to the plunger 165 (Figs. 4 and 5). Another arm 171 of lever 170 carries a pin 172 on its free end which rides in a cam groove 173 in a cam member 174 (Figs. 3 and 4). Each of the arms 169 and 171 terminates in an enlarged central member 176 and they are offset in regard to each other, as best shown in Fig. 3. Passing through the center of the member 176 is a shaft 177 about which the lever 170 pivots; the shaft 177 being journaled in a bearing 178 suitably supported by an angle iron 179 suspended from the under side of the frame. The shaft 177 is held in place in the bearing 178 by a set screw 180.

The bevel gear 51 is secured to one end of a shaft 185 on which is also secured the cam 158 which actuates the blade 147. The shaft 185 is suitably supported in a pair of bearing brackets 186 attached to the underside of the frame (Fig. 2). Secured to the shaft 185 immediately behind the cam 158 is another cam 187, as best shown in Figs. 2 and 3. A roller 188 (Fig. 2) rides on the periphery of the cam 187 and is attached to one end of an arm 189 pivotally secured at its other end to a pin 190 in a boss 191 formed on the projection 156 attached to the frame. Integral with the arm 189 and also pivoted at one end on the pin 190 is another arm 192, the free end of which is enlarged and controls a clutch 193, similar to the clutch 279, for actuating the rolls 126 at predetermined times.

Secured to the shaft 185 in the rear of the cam 187, as best shown in Figs. 3 and 4, is a sprocket 194 which drives the chain 21. Located in the rear of the sprocket 194 is the cam 175 which is keyed to the shaft 185 and which controls the action of the elevating plunger 141, the operation of which will be more fully described hereinafter.

A gear 195 is keyed to the other end of the shaft 185 in the rear of the cam 175, as best shown in Fig. 3, and is adapted to be driven by another gear 196 mounted on the shaft 136. Splined to the end of the shaft 136 is the bevel gear 135 which drives the bevel gear 134 for actuating the rolls 126; the bevel gears being controlled through the clutch 193 as has been previously stated. Keyed to the shaft 136 in front of the gear 196 is the cam member 174 having the cam groove 173 in which the pin 172 rides. Mounted on the other end of the shaft 136 is another gear 181 which is driven by a gear 182 secured to a shaft 183 which may be actuated by any suitable source of power.

Figures 14, 15, 16, 17:
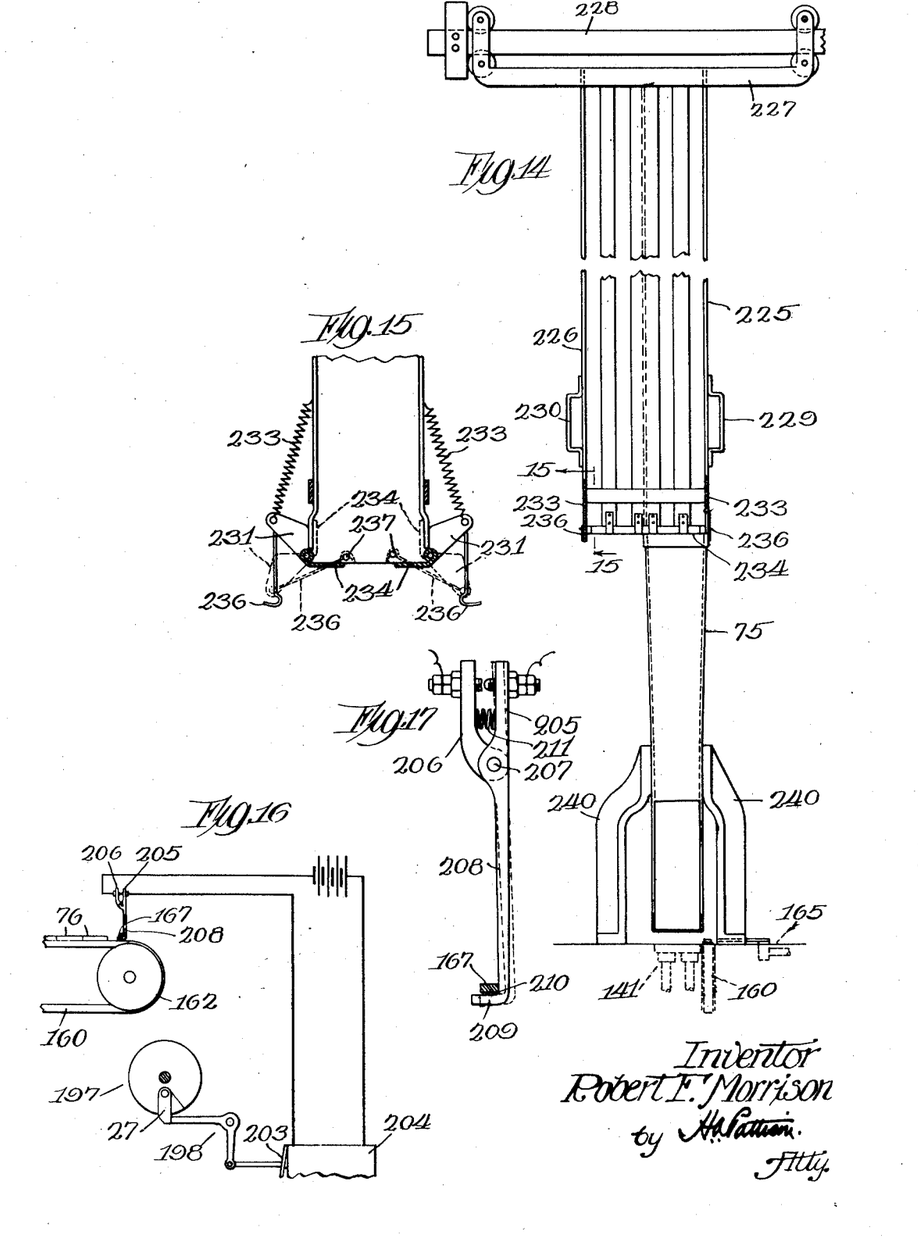
Fig. 14 is an enlarged detail view of the chute and the associated mechanism by which it is filled with cartons.
Fig. 15 is an enlarged fragmentary sectional view taken on the line 15—15 of Fig. 14.
Fig. 16 is a diagrammatic view showing the electrical circuit and belt for actuating a clutch which controls the packing mechanism.
Fig. 17 is an enlarged detail view showing the electrical contacts through which the starting and the stopping of the packing mechanism is controlled.

Associated with the gear 181 is a clutch 197, similar to the clutch 193, through which the gear 181 may be connected or disconnected from the shaft 136 to thereby start or stop the packing mechanism. The clutch is actuated by a bell crank lever 198 pivoted at point 199 to a bracket 200 (Fig. 4), suspended from the frame. The end of one arm 201 of the lever 198 abuts against the detent member 27 of the clutch 197 and the end of the other arm 202 is connected to the armature 203 of a solenoid 204 (Figs. 3, 4 and 16). The electric circuit for operating the armature 203 is controlled by a pair of contact members 205 and 206 (Fig. 17) which are mounted upon a pin 207 suitably supported, immediately over the stop 167, upon the frame (Fig. 16). The contact member 205 is secured to the pin 207 and the contact member 206 is pivotally mounted thereon. The contact member 206 has an arm 208 which has its end formed into a hook like member 209 which extends through an aperture 210 in the stop 167 and is adapted to be engaged by the oncoming blocks 76 on the belt 160. A compression spring 211 interconnecting the contact members 205 and 206 is adapted to return the contacts to their original disengaged position after an operation thereof.

A gear 215 (Fig. 3) is keyed to an end of the shaft 183 and meshes with an idler 213 secured to a shaft 214 suitably journaled in the frame. The idler 213 meshes with and drives a gear 216 which is splined to a shaft 217 suitably supported by the frame of the machine and on which is secured a sprocket 218. The sprocket 218 through a chain 219 drives a sprocket 220 keyed to the shaft 163 to which is secured the belt pulley 162.

The upper part of the chute 75, as best shown in Fig. 14, is adapted to be registered with one of two carton holders 225 and 226. The carton holders 225 and 226 are integral and are carried by an overhead trolley 227 which rides on a track 228, suitably supported from the ceiling. The carton holders 225 and 226 are provided with handles 229 and 230, respectively, for moving said holders into and out of a discharging position. While the carton holder 225 is registered with the chute 75 the other carton holder 226 is free to be charged with cartons, as shown in Fig. 14. Positioned on each side of the lower portion of each of the carton holders is a lever 231 which is pivotally mounted on a pin 232 supported by the end of the carton holder. Secured at one end to the free end of the lever 231 is a spring 233 whose other end is suitably attached to the carton holder. Formed on the pivoted portion of the lever 231 is a retaining jaw 234 which is adapted to be moved or turned upwardly into the orifice of the carton holder. It is to be understood that each carton holder is provided with two of these pivoted jaws 234, which during the charging of the holder with cartons by the operator serve to retain the inserted cartons in the holder, but which may be pushed up into the dotted position shown in Fig. 15 to permit the free ingress of each carton. Secured to the lever 231 is a hook 236 which engages a pin 237 integral with the side of the carton holder, to lock the jaw in the dotted position, previously mentioned after the carton holder has been registered with the chute 75, so as to permit the free discharge of the cartons from the holder into the chute. It will be noted that the chute 75 is rigidly supported on the frame 271 of the machine by a pair of brackets 240 integral with the frame 271. Furthermore, suitable bearings are provided for supporting the various shafts of the packing mechanisms.

The operation of this mechanism is as follows: The operator first fills one of the carton holders 225 or 226 (Fig. 14) with cartons 74 by pushing them one by one upwardly into the carton holder. The jaws 234 (Fig. 15) upon being contacted by the cartons 74 move about the pins 232 into the dotted positions shown in Fig. 15, expanding the springs 233, and permitting the cartons to enter the holder. After the carton holder has been filled with cartons the springs 233 return the jaws to their normal position to support the column of the cartons in the holder. It is apparent, however, that before the springs 233 will move the jaws 234 into their lower or horizontal positions, the cartons in the holder must be pushed upwardly high enough to clear the jaws 234, permitting them to spring back into their normal position. The operator then moves the carton holders along the track 228 by the handle 230 until the orifice of the carton holder, just filled, registers with the inner walls of the chute 75. The levers 231 are then pushed downwardly expanding the springs 233 and moving the jaws 234 upwardly into their dotted positions. It is, of course, understood that the jaws lift the column of cartons until the jaws assume the dotted positions, at which time the cartons 74 are discharged by gravity into the chute 75 until the lowermost carton rests upon the frame, and is in alignment with the magazine 73. The hooks 236 are then brought into engagement with the pins 237 to lock the jaws 234 in their dotted positions. The operator may then fill the other carton holder in like manner and when all the cartons have been discharged from the previously filled holder the empty holder is replaced by the last filled holder and the operation is repeated. Thus, the operator is enabled to always maintain a column of cartons in the chute 75.

The blocks 76 may be fed in any suitable manner onto the belt 160 intermediate the guides 166 (Fig. 1). It will be noted that the belt 160 is continuously driven in the direction indicated by the arrow in Fig. 3, by the pulley 162 through the medium of the sprocket 220, the chain 219, the sprocket 218, the gear 216, the idler 213, the gear 215, and the shaft 183, which shaft, as previously stated, may be driven from any suitable source of power (not shown).

The blocks 76 are carried forward by the belt 160 until the first one is engaged by the stop 167 (Fig. 1) which registers the block with the member 168 of the plunger 165 (Fig. 5). The block 76 in contacting the stop 167 moves the bent portion 209 of the arm 208 into the dotted position shown in Fig. 17 bringing the contacts of the members 205 and 206 into engagement, thereby closing the electrical circuit (Figs. 16 and 17), which may be traced from battery through the winding of the solenoid 204, the contacts carried by the members 205 and 206, and returning to the battery. The solenoid operates and attracts its armature 203, which through the bell crank lever 198 closes the clutch 197, which causes the gear 181 to be connected to the shaft 136 (Fig. 3), thereby starting the packing mechanism, inasmuch as the gear 181 is constantly in mesh with the power driven gear 182. Should for any reason the supply of blocks on the belt 160 be exhausted or the blocks be prevented from engaging the stop 167 the bent portion 209 of the arm 208 through the spring 211 will be pushed through the aperture 210 of the stop 167 into its original position, as shown in Fig. 17. This action in turn would result in separating the contacts of members 205 and 206 and opening the electric circuit, whereupon a spring 212 returns the armature 203 to its normal position. The armature 203 (Fig. 16) in turn returns the lever 198 to its original position opening the clutch 197, thereby disconnecting the gear 181 from the shaft 136, stopping the packing mechanism.

The groove 174 of the cam 173 (Fig. 3) is so designed that in one revolution of the cam it will cause the plunger 165 to be reciprocated once through the medium of the pin 172, which, as previously described, rides in the groove 174. Each time the plunger 165 (Fig. 5) is reciprocated the member 168 pushes the block contiguous with the stop 167 onto the supporting member 142 of the elevating plunger 141 (Fig. 1). During the time the member 168 (Fig. 1) is across the belt 160 the blocks 76 are stopped by the side of the member 168 and the belt 160 slips under them. The time during which this takes place is of such a short duration, however, that although the contacts 205 and 206 are broken the clutch 197 (Figs. 3 and 4) does not have time to operate, inasmuch as there is only one rectangular recess 29 (Fig. 13) in which the semi-circular portion 25 may project through the urging action of the spring 45. It is, of course, apparent that the time during which the contacts are broken when the member 168 is on the belt 160 is less than the time needed for one revolution of the worm wheel 39. After the member 168 recedes, the belt 160 carries another block 76 into a position wherein it is contiguous with the stop 167 which, in other words, is necessarily the same position as that of the previous block.

It will be noted that the gear 196 revolves five times for each revolution of gear 195 and hence the shaft 136 must necessarily revolve at a speed five times that of the shaft 185. This arrangement results in the cam 173 making five revolutions for each revolution of the cams 175, 187 and 158.

The groove 164 of the cam 175 (Fig. 2) is of such a design that immediately after five blocks, or one layer of blocks, have been placed on the elevating plunger 141, it will actuate the bell crank lever 145 to raise the plunger 141 (Fig. 4). The cam 187 (Fig. 2) is of such a shape that immediately before the plunger 141 moves upwardly, the roller 188, through the arms 189 and 192, actuates the clutch 193 which through the bevel gears 134 and 135, shaft 132, bevel gears 131 and 130 actuates the feed rolls 126, causing the paper to be withdrawn from the roll 123 and to be fed over the top of the retaining fingers 98. The cam 187 is so designed that it will permit only enough paper to be placed on the fingers 98 to completely cover the layer of blocks 76 on the plunger 141. It should be noted that when the paper is placed on the retaining fingers 98, it is immediately over the member 142 of the plunger 141.

The periphery of the cam 158 (Fig. 2) is of such a contour that immediately prior to the entrance of the plunger 141 into the magazine 73 and immediately after the paper is placed on the fingers 98, the blade 147 is moved upwardly by the lever 154 to cooperate with the stationary blade 148 (Fig. 5) in cutting from the roll 123 the previously positioned paper. In the upward movement of the plunger 141 the rod 117 which is integral with the rods 143 of the plunger 141 is brought into contact with one end of and operating the lever 115, causing the member 118, which is integral with the lever, to engage the last block of the layer of blocks placed on the elevating plunger, thus bringing the blocks into proper alignment with the opening in the magazine 73. The plunger 141 (Fig. 5) in the upward part of its reciprocation carries the layer of five blocks placed thereon by the plunger 165 upwardly into the magazine 73, pushing the retaining fingers 98 (Fig. 8) outwardly and carrying the paper resting on such fingers upwardly on top of the blocks. The retaining fingers 97 being engaged by the blocks on the plunger 141 move outwardly to permit the passage of the blocks and thereafter spring back into the grooves 146 in the member 142; the teeth 103 of the finger 97 meshing with the grooves 146. This groove and notched arrangement permits the blocks of layers and associated sheets of paper to be retained in the magazine by the retaining fingers 97 when the plunger 141 recedes. It should be understood that the plunger 141 necessarily reciprocates at a much faster rate than the plunger 165 and hence does not interfere with the reciprocation of the latter. The plunger 141 then recedes and this operation is repeated until twenty layers of blocks have been placed in the magazine 73 with sheets of paper separating the layers of blocks. This particular embodiment of the invention is of such a design that a sheet of paper is placed on top of the first layers of blocks in the magazine 73 but no paper is placed under the bottom layer. The purpose of the sheet of paper is to separate the layers of blocks, thereby preventing their surfaces from being damaged or marred.

It should be noted that the device 106 (Fig. 5) permits the side 105 of the magazine 73 to move to and fro so as to enable the magazine 73 to accommodate the blocks 76 even though they are somewhat over size. Furthermore, it is apparent that the effect of the spring 112 upon the side 105 may be varied by the adjusting screw 8 which co-operates with the stop 9 to limit the inward movement of the housing 108.

After twenty layers of five blocks each have accumulated in the magazine 73, the clutch 279 is closed to turn the cam 30 as will now be described in detail. The sprocket 274 (Figs. 3, 4, 11, 12, and 13) is continuously driven by the sprocket chain 21 which is in turn driven by the sprocket 194 through the shaft 185. The worm wheel 38 is continuously driven by the worm 48 which is driven by the shaft 49. It is, of course, to be understood that the worm wheel 38 is driven in an opposite direction to that of the sprocket 274. Normally the cam 30 is in a stationary position, due to the fact that the shoulder 28 of the detent member 27 is engaged by the end of the arm 33, thereby maintaining the semi-circular portion 25 out of engagement with the walls of the rectangular recess 29. The mechanism is so timed that by the time the worm wheel 38 has made one revolution, twenty layers of blocks have been placed in the magazine 73. At the end of each revolution of the worm wheel 38 the bent arm 41 formed thereon engages the detent 34 on the arm 33, raising the end of the arm 33 until it disengages the shoulder 28 of the detent 27 and permitting the spring 45 to expand, to move the member 27 and turn the pin 24, thereby bringing the semi-circular portion thereof into engagement with the walls of the rectangular recess 29, and thus causing the cam 30 to be driven by the sprocket 194 and to make one revolution. It should be noted that the worm wheel 38 is timed to make one revolution for every twenty revolutions of the sprocket 194. At the end of the revolution of the cam 30 the end of the arm 33, which has been restored to its normal position, again engages the shoulder 28 of the detent 27, thus turning the pin 24 and disconnecting the semi-circular portion 25 from the walls of the rectangular recess 29 and arresting the motion of the cam 30.

In response to the rotation of the cam 30 the plunger 64 discharges the blocks from the magazine into the positioned empty carton 74 and transfers the filled carton to the table portion 89 in the following manner: The pin 53 in riding in the groove 52 actuates the rod 54, and since the upper end of the rod is connected to the plunger rods 61, the plunger 64 is reciprocated. The length of the rod is such that the plunger 64 is moved far enough to move the carton and its contents clear of the chute 75. The face of the plunger 64 engages the twenty layers of blocks and the associated separating paper strips assembled in the magazine and pushes them gradually into the positioned carton 74. When the blocks are nearly positioned within the carton 74, the roller 69 engages one arm of the lever 71, pushing it downwardly, thus raising the other arm upwardly, which by that time has partially entered the carton 74, thereby raising the top of the paper carton sufficiently to insure the proper entry of the layer of paper on the top of the blocks into the box.

The blocks 76 in being pushed out of the magazine 73 (Fig. 7) open the doors 77 and expand the associated spring 79. It is, of course, apparent that the doors swung outwardly must necessarily be swung into the positioned carton. After the blocks 76 have been placed completely in the carton 74, the carton 74 and its contents in being pushed through the opening 81 out of the chute 75 must open the stops 82, inasmuch as the bent arms 90 are brought into contact with the associated levers 87. Immediately upon the bent arms 90 contacting the levers 87, the levers 87 are pivoted, disengaging their ends from the associated pins 86 on the levers 83, unlocking the levers 83, permitting them to be pivoted with their stops 82 when the carton is pushed outwardly clear of the chute onto the frame. The reason why the stops 82 must be locked is apparent in that they remain closed until the blocks are completely packed in the carton. Upon the return of the plunger 64 to its original position, the springs 79, 84, and 91 cause the various mechanisms set into motion in the forward stroke of the plunger to be returned to their original position. Also when the plunger 64 clears the magazine on its return, another carton 74 drops into the lowermost position in the chute 75 from which the filled carton has just been ejected. The rotation of the cam 30, as previously described, is arrested by the opening of the clutch 19 until another twenty layers of blocks have been assembled in the magazine 73.

The filled carton 74 (Fig. 19) may be removed from the receiving table portion 89 (Fig. 1) when desired.

What is claimed is:

1. In an apparatus for assembling articles, a stacking mechanism, means for positioning an article upon the stacking mechanism, means for holding a continuous length of separating material, means for withdrawing material therefrom and associating it with the positioned article, means for severing the withdrawn material from the remainder of the material, means for removing the article and associated material from the stacking mechanism into a position to permit of the association of a second article and associated separating material with the stacking mechanism, and means for forming the articles and associated separating materials into a composite group.

2. In an apparatus for assembling articles in a container, a stacking mechanism, means for assembling articles in layers upon the stacking mechanism, means for holding a continuous length of separating material, means operated upon the formation of each layer for withdrawing and separating a predetermined amount of the material from the remainder and for covering the layer with the separated portion, means for removing the layer and associated material from the stacking mechanism to permit of the association of a second layer and associated material with the stacking mechanism, means for forming the layers and separating materials into a composite group, and means for assembling in a container a composite group of predetermined magnitude.

3. In an apparatus for assembling articles in a container, means for supplying articles in a continuous stream along a predetermined path, a receiver, means for transferring articles in predetermined numbers from the path to the receiver to form a group, means for separating a formed group from the receiver to permit a succeeding group to become associated with the receiver and separated group in composite order to form a group of predetermined magnitude, a storage magazine, means for transferring the composite group of articles to the storage magazine, means cooperating with each group of articles to retain the stored groups within the magazine, and means for transferring the contents of the magazine into a container.

4. In an apparatus for assembling articles in a container, means for supplying the articles in a continuous stream along a predetermined path, a receiver, means for transferring articles in predetermined numbers from the path to the receiver to form layers, a storage magazine positioned above the receiver, means for raising the receiver and the positioned layers to form a composite group of articles of predetermined magnitude, means associated with the magazine to permit the entrance and withdrawal of the receiver but cooperating with each layer of articles to retain the stored layers within the container, a door in one wall of the storage magazine, and means for opening the door and transferring the composite group of articles into a container.

5. In an apparatus for assembling articles in a container, means for supplying the articles in a continuous stream along a predetermined path, a receiver for the articles, intermittently operating means for transferring the articles in predetermined numbers from the path to the receiver to form a layer, a storage magazine, intermittent means for forming a pretermined number of layers into a composite group, intermittently operating means for transferring the composite group of layers of articles from the receiver into the magazine, and intermittently operating means for transferring the articles from the magazine into the container.

6. In an apparatus for assembling articles, means for supplying the articles in a continuous stream along a predetermined path, a receiver for the articles, intermittently operating means for transferring the articles in predetermined numbers from the path to the receiver to form a layer, intermittently operating means for withdrawing separating material from a supply and associating it with the layer, intermittently operating means for severing the withdrawn separating material from the supply, and intermittently operating means for transferring predetermined numbers of layers and portions of separating material into the magazine.

7. In an apparatus for assembling articles into containers, a moving belt for advancing articles in a continuous stream, a stop member for engaging the foremost article in the stream, contacts operated by such article to close an electrical circuit, a solenoid included in the circuit and operated by the closure thereof, a source of power, a plunger reciprocable in a direction transversely of the belt to remove therefrom the engaging article and to retain the succeeding article out of engagement with the stop member during the excursion of the plunger, a clutch actuated by the solenoid to connect the plunger with the source of power to reciprocate the plunger, an elevator positioned to receive the removed article, a magazine positioned thereabove, a second clutch closed to connect the elevator with the source of power when a predetermined number of articles have been transferred to form a layer on the elevator, to raise the elevator and deposit the layer of articles in the magazine and subsequently lower the elevator, a roll of separating material, feeding means also operated by the second-mentioned clutch for withdrawing separating material from the roll and feeding it over the layer, means controlled by the second clutch to sever the withdrawn material from the roll, a plurality of fingers associated with the magazine operating to permit the entrance and withdrawal of the elevator but engaging the layer of articles to maintain them within the magazine upon the withdrawal of the elevator, a second plunger having a face forming one side of the magazine, a third clutch to connect the second plunger with the source of power when the magazine has received a predetermined number of layers of articles for reciprocating the second plunger to transfer the stored layers of articles and separating material from the magazine, a carton chute for supplying cartons in a continuous stream, and means for positioning the foremost of the cartons in a position adjacent the magazine to receive the articles as they are transferred from the magazine.

In witness whereof, I hereunto subscribe my name this 5th day of December A. D., 1924.

ROBERT FRANCIS MORRISON.